United States Patent
Prestidge et al.

(10) Patent No.: US 7,676,945 B2
(45) Date of Patent: Mar. 16, 2010

(54) MODULAR MEASUREMENT PROBE

(75) Inventors: Tim Prestidge, Bath (GB); Jonathan P Fuge, Bristol (GB); Stephen E Lummes, Stroud (GB); Stuart K Campbell, Nailsworth (GB)

(73) Assignee: Renishaw PLC, Wotton-under-Edge (GB)

( * ) Notice: Subject to any disclaimer, the term of this patent is extended or adjusted under 35 U.S.C. 154(b) by 98 days.

(21) Appl. No.: 12/216,597

(22) Filed: Jul. 8, 2008

(65) Prior Publication Data

US 2009/0025243 A1  Jan. 29, 2009

Related U.S. Application Data

(60) Provisional application No. 60/996,984, filed on Dec. 13, 2007.

(30) Foreign Application Priority Data

Jul. 26, 2007  (EP) .................................. 07252959
Sep. 13, 2007  (EP) .................................. 07253647

(51) Int. Cl.
G01B 7/012 (2006.01)
G01B 5/012 (2006.01)
(52) U.S. Cl. ......................................... 33/559; 33/561
(58) Field of Classification Search .................. 33/559, 33/556, 558, 561
See application file for complete search history.

(56) References Cited

U.S. PATENT DOCUMENTS

| 4,153,998 | A |   | 5/1979  | McMurtry |             |
|-----------|---|---|---------|----------|-------------|
| 4,477,976 | A | * | 10/1984 | Suzuki   | 33/558      |
| 4,510,693 | A | * | 4/1985  | Cusack   | 33/561      |
| 4,625,417 | A | * | 12/1986 | Cusack   | 33/701      |
| 4,864,294 | A | * | 9/1989  | Fukuhisa | 340/870.01  |
| 5,056,235 | A | * | 10/1991 | Thomas   | 33/503      |
| 5,065,035 | A | * | 11/1991 | Juengel  | 250/551     |
| 5,918,378 | A | * | 7/1999  | McMurtry et al. | 33/556 |
| RE37,030  | E | * | 1/2001  | Lloyd et al. | 33/559   |
| 6,860,026 | B2 | * | 3/2005 | Fuge     | 33/556      |
| 6,922,904 | B2 | * | 8/2005 | Groell et al. | 33/558  |
| 7,464,484 | B2 | * | 12/2008| Schopf   | 33/561      |
| 2004/0039502 | A1 |  | 2/2004 | Wilson et al. |        |
| 2004/0093495 | A1 |  | 5/2004 | Engel    |             |
| 2004/0148792 | A1 | * | 8/2004 | Zanier et al. | 33/561 |
| 2006/0016087 | A1 |  | 1/2006 | Schopf   |             |

(Continued)

FOREIGN PATENT DOCUMENTS

EP  0 293 036 A2  11/1988

(Continued)

*Primary Examiner*—Christopher W Fulton
(74) *Attorney, Agent, or Firm*—Oliff & Berridge, PLC

(57) ABSTRACT

A measurement probe, such as a touch trigger probe, is described that comprises a stylus module attachable to a base module. The stylus module comprising a housing and a stylus holder moveably attached to the housing. The base module comprises a measurement portion for generating measurement data indicative of movement of the stylus holder relative to the housing. The stylus module has an inbuilt failure mode and thereby a substantially predetermined operational lifetime. In one embodiment, the inbuilt failure mode is provided by integrating a battery into the stylus module. Providing a mechanical failure mode in which a component of the stylus module catastrophically fails after a certain amount of usage is also described.

17 Claims, 2 Drawing Sheets

U.S. PATENT DOCUMENTS

2006/0250266 A1 11/2006 Collingwood et al.
2006/0265894 A1 11/2006 Schroll

FOREIGN PATENT DOCUMENTS

| WO | WO 03/021182 A1 | 3/2003 |
| WO | WO 2004/057552 A1 | 7/2004 |
| WO | WO 2007/028964 A1 | 3/2007 |

\* cited by examiner

MODULAR MEASUREMENT PROBE

This nonprovisional application claims the benefit of U.S. Provisional Application No. 60/996,984, filed Dec. 13, 2007.

BACKGROUND OF THE INVENTION i) Field of the Invention

The present invention relates to a measurement probes for use with machine tools and the like and in particular to modular measurement probe apparatus.

ii) Description of Related Art

A variety of measurement probes are known. For example, touch trigger probes are known (e.g. see U.S. Pat. No. 4,153,998) that comprise a kinematic mechanism in which a stylus holder becomes unseated from an associated seat in the probe body when the stylus contacts an object. Unseating of the kinematic mechanism also breaks an electrical circuit allowing a "contact" or trigger signal to be generated. As an alternative to such tough trigger probes, it is also known to measure stylus deflection using strain gauges or the like and to either provide a measure of stylus deflection or to issue a trigger signal when a certain amount of stylus deflection has occurred.

Typically, for machine tools, the measurement probe is provided in the form of a single, mechanically robust, probe body in which the electronic circuitry and deflectable stylus mechanism are housed. The stylus is usually releasably attachable to the stylus holder mechanism of the probe body, for example by a screw thread, to allow different styli to be used for different measurement tasks and to allow worn or broken styli to be replaced. In a machine tool environment, it is typical to provide battery powered measurement probes that communicate with an associated probe interface over a wireless link. An example of such a wireless (RF) measurement probe is available from Renishaw plc under the product name RMP60. A modular version of the RMP60 measurement probe is also known in which various adaptors and extension bars allow a probe module to which a stylus can be attached to be located an extended distance from a probe body that houses the wireless (RF) communications and data processing electronics. Such a modular system is designed to improve the ability to measure inaccessible parts.

SUMMARY OF THE INVENTION

According to a first aspect of the invention, a measurement probe is provided that comprises a stylus module releasably attachable to a base module; the stylus module comprising a housing and a stylus holder moveably attached to the housing; the base module being mountable to co-ordinate positioning apparatus and comprising a measurement portion for generating measurement data indicative of movement of the stylus holder relative to the housing; characterised in that the stylus module has an inbuilt failure mode and thereby a substantially predetermined operational lifetime.

The present invention thus provides a modular, or multi-part, measurement probe for use with co-ordinate position apparatus such as numerically controlled machine tools. The base module of the measurement probe can be mounted to co-ordinate positioning apparatus; for example, it may be mountable in the spindle of a machine tool and/or to the bed or table of a machine tool. The base module also comprises a measurement portion for generating measurement data, such as a trigger signal or stylus deflection information. The stylus module, which is preferably directly and repeatably attachable to the base module, comprises a stylus holder that is moveably attached to a housing such that deflection of a stylus mounted to the stylus holder causes movement of the stylus holder relative to the housing. The stylus module of the measurement probe of the present invention also has an inbuilt failure mode and thereby a substantially predetermined operational lifetime. In other words, the stylus module includes at least one component that is configured to fail or becomes inoperative after a predetermined amount of time or usage.

Providing a modular arrangement in accordance with the present invention has several benefits compared to prior art measurement probes of the type described above in which the majority of components are contained in a unitary probe housing. In particular, a modular measurement probe of the present invention allows most, or preferably all, of the moving parts of the measurement probe to be incorporated into the stylus module. In this manner, it is the components of the stylus module that are subjected to mechanical wear and tear during measurement probe operation. In contrast, the base module is arranged to contain parts of the measurement probe that are not subjected to any significant mechanical wear and therefore has a much longer operational lifetime. For example, the base module may comprise a relatively complex communications portion, such as frequency hopping RF communications unit, in addition to the processing electronics of the measurement portion that analyse raw stylus deflection signals in order to generate the required measurement data. The stylus module may contain some electronics but preferably does not contain any of the relatively expensive electronics that are necessary to implement the measurement probe. In this manner, the stylus module can be provided as a relatively low cost (e.g. disposable or consumable) module.

As outlined above, the stylus module of a measurement probe of the present invention has an inbuilt failure mode such that it has a substantially predetermined operational lifetime. As described in more detail below, the stylus module may comprise one or more batteries for powering the measurement probe that are spent after a certain amount of usage. In such an embodiment, the inbuilt failure mode arises from exhaustion of the batteries and the operational lifetime is determined by the battery capacity. Alternatively, and as also described in more detail below, a part of the stylus module may be arranged to mechanically fail after a certain amount of usage.

Providing such a failure mode allows the manufacturer to preset or control the expected lifetime of the stylus module. After failure of the stylus module, the measurement probe can be reactivated by pairing a new stylus module with the base module. The present invention can thus provide a stylus module that is arranged to fail before the moving parts therein become sufficiently worn that measurement accuracy is degraded. This ensures that measurement accuracy is maintained. Furthermore, the present invention can also allow a manufacturer to initially sell the modular measurement probe at a substantial discount relative to single piece measurement probes and to recoup the cost of providing such an initial discount through continuing sales of stylus modules. This also benefits users who may be unsure of the benefits of probing technology on their production process by allowing them to adopt the technology at a lower upfront cost.

The measurement probe is preferably battery operated. Advantageously, the stylus module comprises at least one battery. When the base module is attached to the stylus module, the at least one battery of the stylus module conveniently supplies electrical power to the base module. In other words, the stylus module may comprise a power source that, during use, powers the measurement portion and any wireless communications portion of the base module. This allows the base module to be provided as a permanently sealed unit that does not require any kind of battery compartment that has to be periodically opened to access the batteries. The lack of any kind of battery compartment opening helps to protect the components of the base module from damage arising from coolant, swarf or other contaminants entering the device during battery replacement. It should be noted that whilst the stylus module preferably supplies all necessary electrical power to the base module, the base module may also contain one or more batteries if necessary. For example, the base module may contain one or more long life batteries to continuously power certain electrical components (e.g. memory chips etc). Advantageously, only a small current is ever drawn from any batteries that are provided in the base module thereby ensuring the operational lifetime of the base module is not significantly limited by such batteries. Any base module batteries may be rechargeable, for example using electrical power supplied by the stylus module.

Preferably, the at least one battery of the stylus module is permanently integrated within the stylus module. In other words, the one or more batteries of the stylus module may be provided or formed integrally with, and are preferably non-removable from, the stylus module. Advantageously, the at least one battery can not be removed from the housing of the stylus module without irreversible damaging at least part of the stylus module. For example, the stylus module may include a moulded plastic housing inside which the battery is contained. In such an example, removal of the battery may only be possible by physically breaking or cutting open the plastic housing thereby reducing the strength of the stylus module and providing an opening through which swarf, coolant and other contaminants may enter. In this manner, the measurement probe can operate with a certain stylus module only until the batteries of that module are exhausted. At that point, the stylus module is disposed of and a replacement stylus module combined with the base module to provide an operable measurement probe. Providing such a dedicated battery can also allow the size of the stylus module to be reduced relative to a stylus module having a battery compartment for retaining standard size batteries. Conversely, bespoke batteries may be provided that maximise the amount of electrical power that can be stored in a stylus module of a certain size.

Advantageously, the measurement probe comprises an indicator for signalling when the one or more batteries of the stylus module are running low. The indicator may be visible and/or audible. For example, the measurement probe may comprise one or more LEDs that provides a low battery warning and/or a loudspeaker that issues a "beep" warning. Preferably, the battery monitoring circuitry and/or the low battery indicator are provided as part of the base module to provide a warning that the attached stylus module will shortly need replacing.

In use, the stylus module preferably comprises a stylus. The distal, or object contacting, end of the stylus may carry a ruby ball or tool setting cube. The stylus may be releasably attachable to stylus holder; for example, the proximal end of the stylus may comprise a thread that can be screwed into engagement with a complimentary threaded recess provided at the stylus holder. In this manner, the stylus that is attached to the stylus module may be changed as required.

Advantageously, the stylus module comprises a stylus that is integrated with the stylus holder. In other words, a stylus is provided as part of the stylus module that can not, in normal use, be detached from the stylus holder. In this manner, any damage to the stylus requires replacement of the entire stylus module rather than the replacement of the stylus alone.

Providing a stylus module with an integrated stylus allows the stylus module to be appropriately calibrated prior to attachment to the base module. In other words, the in-situ measurement probe calibration process that is typically required when a new stylus is attached to a measurement probe for the first time can be avoided by providing a stylus module with a stylus already secured thereto. For example, the neutral position of the stylus relative to the housing may be appropriately centred or "jigged" during manufacture of the stylus module. If the stylus module also comprises a mechanical seating arrangement, the spring force that is applied to return the stylus to the neutral position may also be set as required during stylus module manufacture. In this manner, a broken stylus is replaced by attaching a new stylus module to the base module.

Advantageously, the measurement probe comprises one or more sensors that provide one or more deflection signals indicative of relative movement between the stylus holder and the housing. The one or more sensors may, for example, comprise strain gauges, capacitance sensors, optical sensors etc. Preferably, the one or more sensors are incorporated as part of the stylus module. Alternatively, the one or more sensors may be located in the base portion and arranged to sense any movement of the stylus holder relative to the housing of an attached stylus module. For example, optical sensors provided in the base module may be arranged to sense movement of a reflective element attached to the stylus holder.

In use, the one or more deflection signals produced by the one or more sensors are conveniently passed to the measurement portion of the base module. Advantageously, the measurement portion is arranged to generate the required measurement data from the one or more deflection signals. For example, the measurement portion may include a processor that converts deflection signals from a plurality of sensors, such as strain or capacitance sensors, into stylus tip deflection values provided in a measurement probe Cartesian co-ordinates (a,b,c). Alternatively, the measurement portion may generate measurement data in the form of a trigger signal that is issued when it is determined that the stylus has been deflected by more than a certain amount.

Advantageously, the stylus module comprises a deflection mechanism that mounts the stylus holder to the housing. Conveniently, the deflection mechanism urges the stylus holder into a repeatable neutral or zero position in the absence of any externally applied force. If a battery is provided as an integral part of the stylus module, the housing of the stylus module may be arranged such that any attempt to access the housing irreversibly damages the deflection mechanism. For example, the battery casing may form part of the structure that provides the deflection mechanism such that an attempt to remove a battery disturbs the deflection mechanism. In this manner, use of a stylus module after its battery has been exhausted can be prevented.

Preferably, the deflection mechanism takes the form of a kinematic seat arrangement of known type. The deflection mechanism may thus comprises first locating elements provided on the housing and second locating elements provided on the stylus holder, wherein the first and second locating elements co-operate to locate the stylus holder in a repeatable position relative to the housing. The deflection mechanism also conveniently comprises a bias, such as a spring mechanism, for urging the first and second locating elements into contact. In a preferred embodiment, the first locating elements may comprise three pairs of balls that each provide a v-shaped seat and the second locating elements may comprise three rollers that engage the balls thereby supporting the stylus holder on the seat.

The measurement probe may comprise a so-called resistive touch trigger probe in which a trigger signal is issued when a first locating element of the stylus holder becomes unseated from the associated second locating elements of the housing. Advantageously, the first and second locating elements form part of an electrically conductive path such that, when a first locating element disengages a second locating element, the electrically conductive path is broken. In such an arrangement, the measurement portion of the base module is conveniently arranged to monitor the resistance of the electrically conductive path and to generate measurement data in the form of a trigger signal when the electrically conductive path is broken. The measurement portion may include data processing electronics of known type, such as described in WO03/021182, to reduce the possibility of false triggers etc.

As outlined above, the operational lifetime of the stylus module of the present invention is preset by building a mechanical failure mode into that module. Advantageously, at least one component of the stylus module is configured to mechanically fail after a certain amount of usage. To provide such a failure mode, the deflection mechanism may conveniently be configured to catastrophically fail after a certain amount of usage. By catastrophically fail, it is meant that the deflection mechanism will operate normally for a certain amount of usage and then completely fail. Catastrophic failure should thus be contrasted to progressive failure in which the measurement performance of the stylus module degrades gradually over time until complete failure. To implement a catastrophic failure mode, the stylus module may include a frangible, brittle or shearable part, such as a weakened section of spring, that can be flexed or moved a certain number of times before snapping or shearing.

Instead of, or in addition to, providing a mechanical failure mode as described above, a pre-programmed or electronic failure mode may also be incorporated into the stylus module. For example, stylus module may comprises electronic circuitry that includes a deactivation portion that inhibits normal operation of the stylus module (thereby making the stylus module inoperable) after a certain amount and/or time of stylus module usage. An apparatus usage module may also be provided as part of the stylus module that stores appropriate measurement probe usage information (e.g. a trigger count value) that can be read by the deactivation portion. More details concerning such a deactivation arrangement can be found in Applicant's co-pending application that also claims priority from European application 07252959.7.

The stylus module may comprise a plurality of in-built failure modes. Advantageously, the above described battery and/or electronic failure modes may be used in combination with a mechanical failure mode. For example, the mechanical failure mode may be provided by including a component (e.g. as part of the stylus deflection mechanism) that mechanically fails after a certain amount of usage (e.g. after more than approximately ten thousand triggers). The electronic failure mode may then be arranged to prevent stylus module operation before such mechanical failure occurs (e.g. after eight thousand triggers). In this manner, appropriate warnings of impending stylus module failure can, if required, be provided to a user. In such an arrangement, any unauthorised interference with, or resetting of, the electronics by a user would provide a short and unpredictable amount of additional stylus module usage before the mechanical failure mode prevented ongoing operation. A progressive mechanical failure mode may also be used in such an arrangement.

The measurement probe may be a wireless device. All, or some, of the measurement data generated by the measurement portion of the base module may then be passed to an associated interface or controller via a wireless (e.g. RF or optical) link. The base module advantageously comprises a wireless communications portion that allows such measurement data to be passed to a remote probe interface over a wireless link. The wireless communications portion may also be arranged to receive information from an associated probe interface; for example, measurement probe operation instructions may be passed to the measurement probe via the probe interface. The wireless link may be a spread spectrum, e.g. frequency hopping, link such as that described in WO 2004/057552.

The stylus module may be directly and repeatable attachable to the base module. Alternatively, an intermediate extension joint may be located between the base module and the stylus module. Advantageously, the stylus module comprises a first kinematic mounting portion and the base module comprises a second kinematic mounting portion, the first and second kinematic mounting portions co-operating to locate the stylus module in a repeatable position relative to the base module. Advantageously, the stylus module and the base module each comprise a plurality of complimentary electrical contacts that provide, when the base module is attached to the stylus module, a plurality of electrical connections between the stylus module and the base module. Power and/or electrical signals may be passed between the base module and the stylus module via such electrical contacts.

The measurement probe may be arranged for use as a spindle mounted probe and/or as a table top mounted probe. For example, the base module may include or be attachable to a shank that can be held in the spindle of a machine tool. A spindle mountable measurement probe is conveniently used in combination with a stylus module that comprises a stylus having a ball attached to its distal end. Alternatively, the base module may include an attachment mechanism (e.g. a kinematic or magnetic mount) that allows attachment to the bed of a machine tool. A stylus module comprising a tool setting tip (e.g. a cube) may be used with such a table top mounted base module. Although the use of measurement probes with a machine tool is described in detail herein, a measurement probe of the present invention may be used with any position measurement apparatus. For example, measurement probes of the present invention could be used with dedicated co-ordinate measuring machines (CMMs) or the like.

According to a second aspect of the invention, a stylus module for a measurement probe is provided; the stylus module comprising a housing and a stylus holder moveably attached to the housing; the stylus module being attachable to an associated base module that comprises a measurement portion for generating measurement data indicative of movement of the stylus holder relative to the housing; characterised in that the stylus module has an inbuilt failure mode and thereby a substantially predetermined operational lifetime.

According to a further aspect of the invention, a battery operated measurement probe is provided that comprises a base module and a stylus module, wherein the base module comprises measurement circuitry and the stylus module comprises a deflectable stylus holder to which a workpiece contacting stylus can be attached, characterised in that the stylus module incorporates at least one battery that, when the base module is attached to a stylus module, supplies power to the measurement circuitry of the base module.

According to a further aspect of the invention, a stylus module is provided that comprises a stylus, characterised in that the stylus module comprises at least one battery.

According to a further aspect of the invention, a stylus module is provided that comprises a stylus holder attached to a housing, wherein the stylus module has an inbuilt failure mode and thereby a substantially predetermined operational lifetime. Advantageously, the stylus holder is attached to the housing by a deflectable mechanism, wherein the deflectable mechanism is configured to catastrophically fail after a substantially predetermined amount of usage.

The invention will now be described, by way of example only, with reference to the accompanying drawings in which;

DETAILED DESCRIPTION OF THE PREFERRED EMBODIMENTS

Figure 1:
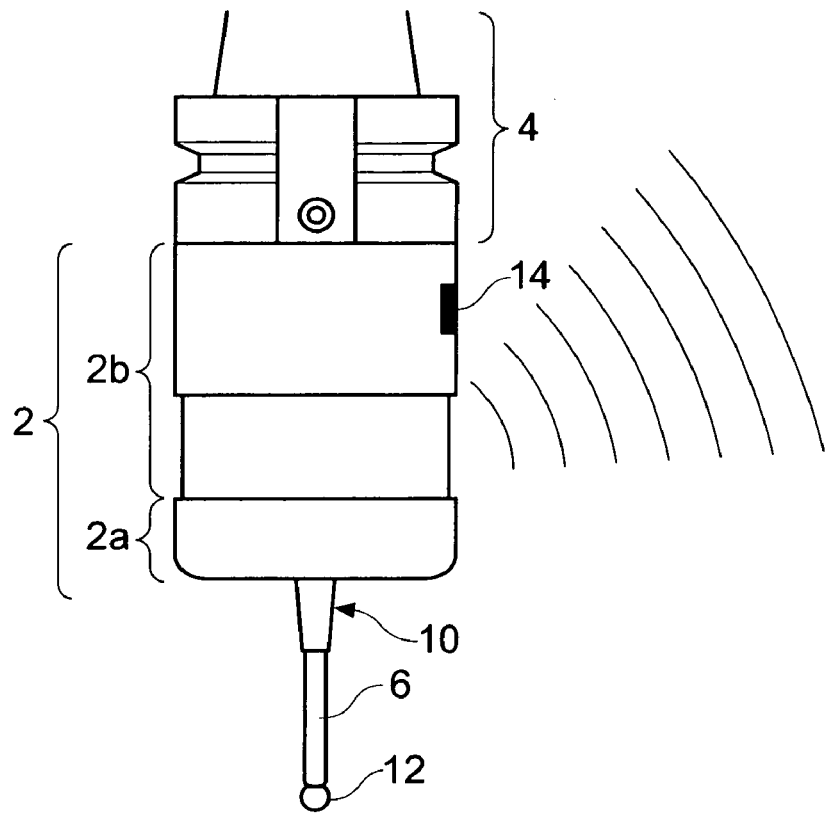
FIG. 1 illustrates a prior art measurement probe.

Referring to FIG. 1, a prior art wireless measurement probe for a machine tool is illustrated. The illustrated measurement probe is commercially available from Renishaw plc, Wotton-under-edge, Gloucestershire, UK under the product name RMP60.

The measurement probe comprises a probe body 2 attached to a shank 4 that can be received in the spindle of a machine tool. The proximal end of a stylus 6 is releasably attached to a stylus holder of the probe body 2 by a screw thread connection 10. The distal end or tip of the stylus 6 comprises a workpiece contacting ruby ball 12.

The measurement probe is a touch trigger probe in which the stylus holder is attached to the probe body by a spring-loaded kinematic arrangement of the type originally described in U.S. Pat. No. 4,153,998. The spring-loaded kinematic arrangement provides six points of contact between the stylus holder and the seat of the probe body such that the stylus holder is held in a repeatable "neutral" or home position. The spring-loaded kinematic arrangement allows the stylus to be deflected relative to the probe body as it meets the surface of a workpiece, whilst the spring ensures that the mechanism reseats whenever the stylus is in free space. A conductive path runs through the contacts and the resistance through this circuit is measured by the probe's electronics. Unseating of one or more of the kinematic points of contact thus produces a measurable change in the resistance of the circuit. A processor is provided as part of the measurement probe to analyse the resistance of the circuit and to generate a trigger signal whenever the stylus is deflected by contact with an object; this is described in more detail in WO03/021182.

The electronics of the measurement probe are battery powered and a sealed battery compartment 14 is provided as part of the probe body 2. A frequency hopping radio-frequency communications unit is also provided within the probe body 2 for wirelessly transmitting trigger signal data to an associated remote probe interface (not shown). The frequency hopping protocol used to communicate with the interface is described in more detail in WO2004/057552.

Prior art measurement probes for machine tools are typically provided as single, unitary, probe bodies of the type shown in FIG. 1. It is, however, also known to provide a two part, modular, measurement probe system. Such a system is presently available from Renishaw under the product name RMP60M. In such a modular system, the measurement probe is split into two separate modules that can be repeatably attached to one another. This may be thought of as splitting the probe body 2 shown in FIG. 1 into two parts; e.g. into first and second sections 2a and 2b. The first section 2a is a probe module that includes the spring-loaded kinematic arrangement and the second section 2b is a probe base that includes the battery compartment and associated measurement and communications electronics. Different length extension bars may then be fitted between the probe base and the probe module to increase the effective length of the probe without having to increase the length of the stylus. Modular arrangements of this type enable the inspection of part features that are inaccessible to non-modular, shorter, measurement probes without requiring the use of overly long styli.

Figure 2:
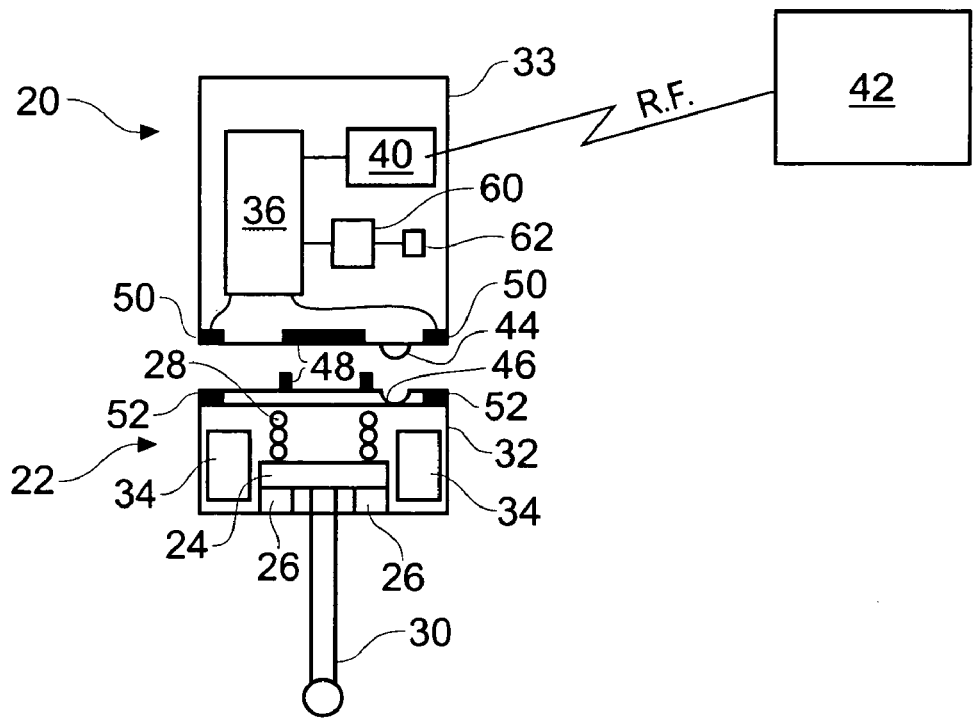
FIG. 2 shows a modular measurement probe of the present invention having a stylus module that includes an integral battery.

Referring to FIG. 2, a modular measurement probe of the present invention is illustrated. The measurement probe comprises a base module 20 and a stylus module 22.

The stylus module 22 comprises a spring-loaded kinematic arrangement of known type in which a stylus holder 24 is urged into contact with a seat 26 of the stylus module housing by a spring 28. The stylus holder also comprises an integral, non-detachable, workpiece contacting stylus 30 and a battery 34. The stylus may be permanently bonded (e.g. glued or welded) to the stylus holder or the stylus and stylus holder may be formed together as a single component. The neutral position of the stylus and the reseat force applied by the spring 28 are set during manufacture. Although setting the neutral position and reseat force during manufacture is preferred for a touch trigger probe, a stylus offset value could alternatively be measured if the stylus module comprised an analogue probe.

Although the stylus module 22 has an integral stylus, it would also be possible to provide a stylus holder to which a stylus could be removeably attached (e.g. by a standard screw thread connection). This would allow stylus replacement, but could introduce a requirement for the user to recalibrate the neutral position of the stylus module and/or adjust the reseat force after stylus replacement. The stylus module 22 also comprises an outer casing 32 that is sealed to prevent access to the various internal components of the stylus module after manufacture. The seal is also sufficient to prevent fluid (e.g. coolant) egress into the stylus module during use.

The base module 20 comprises a measurement portion 36 that is arranged to monitor the resistance of the electrical circuit that is provided through the contacts of the spring-loaded kinematic arrangement of the stylus module. The measurement portion 36 thus generates a trigger signal whenever object contact is detected and this trigger signal is passed to a frequency hopping RF communications portion 40 for onward transmission to an associated probe interface 42. The RF communications portion and associated interface may implement any suitable communications protocol; for example, the protocol described in WO2004/057552 may be used. The base module 20 also comprises a sealed outer housing 33 to prevent damage to the electronic components contained therein.

The stylus module 22 is releasably attachable to the base module 20. In particular, a kinematic or pseudo-kinematic connection is provided between the stylus module 22 and the base module 20 so that the stylus module 22 and base module 20 can be repeatably mounted to one another. To provide the kinematic location, three protruding balls 44 are provided on the base module 20 and three complimentary grooves 46 are formed on the stylus module 22 (noting that only one ball and one groove are shown in FIG. 2). A screw-thread connector 48 is also provided for maintaining engagement of the base module 20 and stylus module 22 after connection. It should be noted that a skilled person would be aware of numerous alternative techniques for providing a repeatable physical connection between the stylus module and base module. For example, a joint of the type described in EP293036 could be used.

A plurality of first electrical contacts 50 are provided on the base module 20 and complimentary second electrical contacts 52 are provided on the stylus module 22. The first and second electrical contacts 50 and 52 allow, when the stylus module and base module are attached to one another, electrical power to be routed from the battery 34 of the stylus module 22 to the electrical components (i.e. the measurement portion 36 and wireless communications portion 40) of the base module 20. Similarly, a conductive electrical path may be provided between the base and stylus modules to allow the measurement portion 36 of the base module to measure the resistance of the electrical circuit that is provided through the contacts of the spring-loaded kinematic arrangement of the stylus module. Again, the present example merely describes one way in which a plurality of electrical connections could be provided between the base and stylus modules and should not be seen as in any way limiting. A skilled person would appreciate the numerous alternative techniques, such as the provision of one or more complimentary electrical connectors, that could alternatively or additionally be used to establish the necessary electrical connections.

In use, the stylus module 22 and base module 20 are brought into engagement. As described above, the stylus module 22 is a sealed unit in which the spring force and stylus neutral position has been set during manufacture. By virtue of the kinematic connection between the base and stylus modules, the relative position of the modules is also accurately defined. There is consequently no need for a user to perform any kind of calibration of the measurement probe prior to use, although a calibration check could be performed if required.

Physically engaging the stylus and base modules 22 and 20 also establishes the necessary electrical connections between these modules. The electronics of the base module 20 are then powered by the battery 34 of the stylus module 22. At this point, the measurement probe can operate in the same manner as a traditional measurement probe. For example, the measurement probe may be held in the spindle of a machine tool and used to inspect work-pieces. Any deflection of the stylus 30 results in the generation of a trigger signal by the measurement portion 36 that is passed via the communications portion 40 to the probe interface 42. The probe interface may then pass a trigger signal to an appropriate input of the machine tool numeric controller.

The battery 34 of the stylus module 22 has a finite capacity and the amount of power that is drained from the battery 34 by the electronics of the base module 20 will depend on the amount of measurement probe usage. A typical battery can be expected to continuously power the electronics of the base module 20 for several hundred hours. Measurement probes are, however, typically only used intermittently for inspection processes performed between machining operations. The measurement probe may thus include a stand-by mode in which the majority of the electronics of the base module 20 are powered down when measurements are not being taken. The measurement probe may be then awakened from the standby mode in various known ways; e.g. by a shank switch, by a spin turn-on switch or by a radio turn-on technique using the probe interface. A typical battery would be able to power such a standby mode for several hundred days, depending on the power consumption associated with the particular standby mode.

The storage capacity of the battery 34 can thus be selected by a manufacturer to provide a certain or predetermined amount of measurement probe usage. In other words, the stylus module has a finite, predetermined, operational lifetime before failure of the battery occurs. The operational lifetime of the stylus module may be based on an estimate of the typical amount of probe usage and the number of days operation that are required. After the battery 34 has been drained, or the power that the battery can provide has dropped below an acceptable level, operation of the measurement probe ceases. The battery 34 is formed integrally with, and can not be removed from, the stylus module and hence a user is unable to access and replace the battery 34. Instead, the exhausted stylus module must be discarded or returned to a manufacturer for recycling. A new stylus module can be attached to the base module 20, without the need to perform any calibration as described above, to continue measurement operations.

The base module 20 may include a battery status monitoring device 60 for assessing the power remaining in the battery 34 of the stylus module. The status of the battery may be communicated to a user by one or more LEDs provided on the base module 20. For example, an LED indicator may be provided that is coloured green when the battery is in good condition, amber when the battery is near exhaustion and red when the battery is, or is very shortly going to be, exhausted. Battery status information may also be passed to the interface 42 via the wireless link. A battery monitor of this type gives advanced warning to a user that a replacement stylus module is shortly going to be required.

Although not illustrated in FIG. 2, the stylus module 22 may include a battery that is not just located or sealed within the stylus module but is actually provided as an integral part of that module. For example, the battery may be engaged with the spring that causes reseating of the stylus holder such that any attempt to remove the battery requires the spring force to be readjusted. Alternatively, the battery casing may form part of the seating mechanism that the stylus holder engages such that battery removal requires the stylus neutral position to be reset.

In this manner, replacement of the battery by a user (e.g. by breaking open the stylus module casing) not only damages the casing but also results in a need for recalibration of the stylus module.

Although the above examples describe a stylus module that includes a minimal amount of electronics, it should be noted that additional electronic components may be included within the stylus module as required. For example, the stylus module itself could comprise circuitry for monitoring battery life and/or at least some of the circuitry that is used for processing stylus deflection data.

It should be noted that the invention is in no way limited to stylus modules that include spring-loaded kinematic arrangements of the type described above. The measurement probe may include any type of stylus deflection measurement mechanism. For example, strain gauges or optical sensors may be used to measure stylus deflection. Similarly, the invention extends not only to touch trigger probes that issue a trigger signal when stylus deflection exceeds a certain threshold but is equally applicable to so-called analogue or scanning probes in which co-ordinate data indicative of stylus position is generated. Furthermore, the sensors that measure stylus holder deflection do not necessarily have to be provided as part of the stylus module. Instead, the base module may include sensors (e.g. one or more optical sensors) that monitor deflection of the stylus holder of an associated stylus module.

The above examples include RF portions for transmitting data to a probe interface. Although a RF communications link is described, the measurement probe may include other types of wireless (e.g. optical) communications system. Furthermore, a hardwired arrangement could alternatively be provided.

The measurement probe described herein can be attached to a shank for spindle mounting. Alternatively, the measurement probe may be table mounted to allow tool setting operations to be performed. A range of stylus modules that include different types of styli (e.g. different length styli, styli with different tips etc) may be provided. A plurality of different stylus modules may also be provided that are compatible with a single type of base module; a user may then simply select the stylus module required for a particular task.

Figure 3:
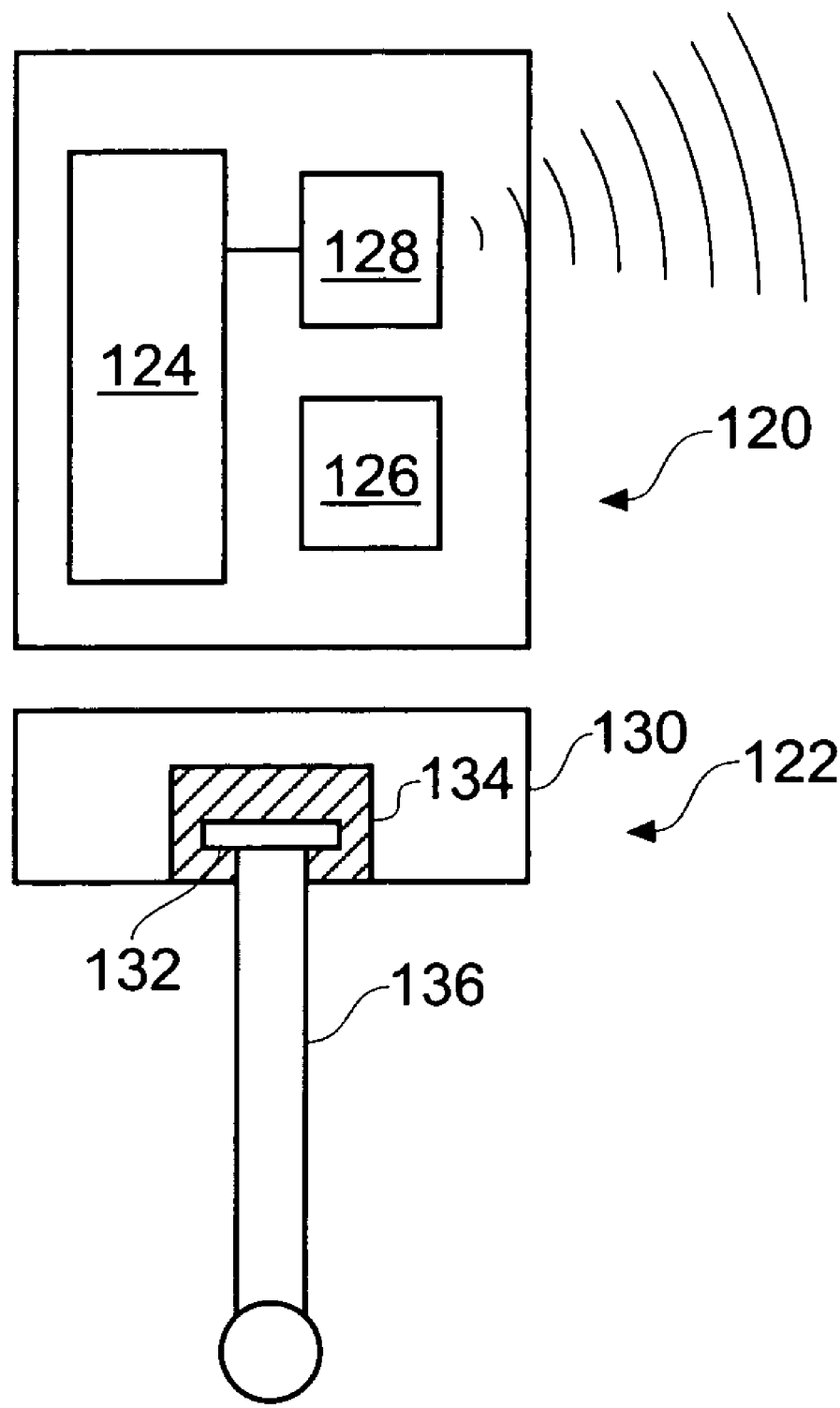
FIG. 3 illustrates a further modular measurement probe of the present invention having a mechanical failure mode.

Referring to FIG. 3, a further measurement probe of the present invention is illustrated that comprises a base module 120 and a stylus module 122. The base module and stylus module are releasably and repeatably attachable to one another in the same manner as described above with reference to FIG. 2, although the attachment mechanism is not shown in FIG. 3 for clarity.

The base module 120 comprises a measurement portion 124, a battery 126 and a RF communications portion 128. The stylus module 122 comprises a housing 130 and a stylus holder 132 that are connected by a deflection mechanism 134. The stylus holder 132 has a integral stylus 136 protruding therefrom. The deflection mechanism 134 thus permits the stylus 136 and stylus holder 132 to move relative to the housing 130. In use, movement of the stylus holder 132 relative to the housing 130 is detected and a trigger signal is generated by the measurement portion 124 whenever the stylus is deflected by more than a certain amount. The RF communications portion 128 then passes such a trigger signal to a remote probe interface (not shown).

The deflection mechanism 134 is also arranged to have a component that catastrophically fails after a certain amount of usage. The deflection mechanism of the stylus module 134 may thus include a frangible, brittle or shearable part, such as a weakened section of spring, that can be flexed or moved a certain number of times before snapping or shearing. As outlined above, catastrophic failure of the deflection mechanism is preferred rather than a progressive failure mode that would result in a gradual reduction in performance with use. Although mechanical failure of a part of the deflection mechanism 134 is described, it should be noted that any suitable part of the stylus module may provide the necessary mechanical failure.

Although not shown in FIG. 3, the stylus module 122 could also comprise a electronic deactivation portion that inhibits stylus module operation after a certain number of measurements have been acquired and/or after certain amount of elapsed time. Such an electronic failure mode may be used in combination with the mechanical failure mode. For example, the stylus module lifetime may ultimately be limited by a catastrophic or progressive failure mode built into the hardware (e.g. the stylus deflection module) but an electronic failure mode may also be provided that inhibits operation typically before mechanical failure occurs. In this manner, appropriate warnings of impending stylus module failure can be provided to a user whilst any unauthorised interference with or resetting of the electronics by a user would only provide a short and possibly unpredictable amount of additional stylus module usage before the mechanical failure mode prevents ongoing operation. The above described battery failure mode could also be used in combination with the mechanical failure mode for analogous reasons.

It should be remembered that the above examples are merely intended to illustrate preferred embodiments of the invention. The skilled person would be aware of the numerous alternatives devices that could be provided in accordance with the invention.

We claim:

1. A measurement probe comprising a stylus module releasably attachable to a base module;
   the stylus module comprising a housing and a stylus holder moveably attached to the housing;
   the base module being mountable to co-ordinate positioning apparatus and comprising a measurement portion for generating measurement data indicative of movement of the stylus holder relative to the housing;
   wherein the stylus module has an inbuilt failure mode and thereby a substantially predetermined operational lifetime.

2. A measurement probe according to claim 1 wherein the stylus module comprises at least one battery.

3. A measurement probe according to claim 2 wherein, when the base module is attached to the stylus module, the at least one battery of the stylus module supplies power to the base module.

4. A measurement probe according to claim 2 wherein the at least one battery is permanently integrated within the stylus module.

5. A measurement probe according to claim 2 wherein the inbuilt failure mode arises from exhaustion of the at least one battery and the substantially predetermined operational lifetime is determined by the battery capacity.

6. A measurement probe according to claim 1 wherein the stylus module comprises a stylus, wherein the stylus is permanently integrated with the stylus holder.

7. A measurement probe according to claim 1 wherein the stylus module comprises one or more sensors that provide one or more deflection signals indicative of relative movement between the stylus holder and the housing.

8. A measurement probe according to claim 7 wherein, in use, the one or more deflection signals are passed to the measurement portion of the base module, wherein the measurement portion is arranged to generate the measurement data from the one or more deflection signals.

9. A measurement probe according to claim 1 wherein at least one component of the stylus module is configured to mechanically fail after a certain amount of usage.

10. A measurement probe according to claim 1 wherein the stylus module comprises a deflection mechanism that mounts the stylus holder to the housing.

11. A measurement probe according to claim 10 wherein the deflection mechanism comprises first locating elements provided on the housing and second locating elements provided on the stylus holder, the first and second locating elements co-operating to locate the stylus holder in a repeatable position relative to the housing, wherein the deflection mechanism also comprises a bias for urging the first and second locating elements into contact.

12. A measurement probe according to claim 11 wherein the first and second locating elements also form part of an electrically conductive path such that, when a first locating element disengages a second locating element, the electrically conductive path is broken, wherein the measurement portion of the base module is arranged to monitor the electrically conductive path and generate measurement data in the form of a trigger signal when the electrically conductive path is broken.

13. A measurement probe according to claim 10 wherein the deflection mechanism is configured to catastrophically fail after a certain amount of usage.

14. A measurement probe according to claim 1 wherein the base module comprises a wireless communications portion that allows measurement data to be passed to a remote probe interface over a wireless link.

15. A measurement probe according to claim 1 wherein the stylus module comprises a first kinematic mounting portion and the base module comprises a second kinematic mounting portion, the first and second kinematic mounting portions co-operating to locate the stylus module in a repeatable position relative to the base module.

16. A stylus module for a measurement probe;
the stylus module comprising a housing and a stylus holder moveably attached to the housing;
the stylus module being attachable to an associated base module that comprises a measurement portion for generating measurement data indicative of movement of the stylus holder relative to the housing;
wherein the stylus module has an inbuilt failure mode and thereby a substantially predetermined operational lifetime.

17. A battery operated measurement probe for co-ordinate positioning apparatus comprising;
a base module mountable to co-ordinate positioning apparatus, the base module comprising measurement circuitry; and
a stylus module releasably attachable to the base module, wherein the stylus module comprises a deflectable stylus holder to which a workpiece contacting stylus can be attached,
wherein the stylus module incorporates at least one battery that, when the base module is attached to a stylus module, supplies power to the measurement circuitry of the base module.

* * * * *